Patented Feb. 16, 1932

1,844,99

UNITED STATES PATENT OFFICE

ARTHUR C. WHITE, OF MIDLAND, MICHIGAN, ASSIGNOR TO THE DOW CHEMICAL COMPANY, OF MIDLAND, MICHIGAN, A CORPORATION OF MICHIGAN

BRINE FOR REFRIGERATING AND OTHER USES

No Drawing. Application filed November 26, 1924. Serial No. 752,448.

As is well known, an aqueous solution of calcium chloride, $CaCl_2$, constitutes an efficient brine for use in refrigerating apparatus as well as an anti-freeze mixture for use in the radiators of internal combustion engines. A calcium chloride solution, however has the objectionable feature that it is unduly corrosive in its action, particularly when used in the presence of galvanized iron, such as is used in refrigerating apparatus, or in the presence of zinc as an ingredient of the brass employed in automobile radiators.

I have discovered, however, that this corrosive action may be substantially, if not entirely, overcome by the inclusion in the calcium chloride solution of certain other salts. The invention, then, consists of the combination of ingredients or novel composition of matter hereinafter fully described and particularly pointed out in the claims, the following description setting forth only several of the various ingredients which may be thus added to a brine designed for refrigerating or like uses.

The strength of the aqueous solution of calcium chloride that constitutes the body of my improved composition of matter, whether the latter be used as a refrigerating brine or as an anti-freeze mixture, will of course depend upon the temperature which such solution is required to withstand without freezing. Such a solution, however, containing approximately 27½ per cent. of calcium chloride will not freeze at a temperature of minus 30 degrees F., or above, and will serve as an illustration of a typical solution adapted for use in refrigerating apparatus. In order to overcome the corrosive tendency of such solution, hereinbefore referred to, I preferably add an amount of zinc chloride, $ZnCl_2$, equal in weight to one per cent. of the calcium chloride present in the solution. The proportion of zinc chloride thus used will remain approximately the same whether the calcium chloride solution be more or less concentrated than the typical solution specified above. I have found that the presence of such zinc chloride in the solution by increasing the zinc ion concentration of the solution tends to prevent solution of the metal used for galvanizing; in other words, effectively overcomes the tendency of the calcium chloride when by itself.

I am aware that it has heretofore been proposed to employ in an anti-freeze solution for use in automobile radiators the chlorides of two metals each having a higher negative electromotive force than zinc (see British Patent No. 189,741). I have found, on the contrary, that it is sufficient if only one such metallic chloride possesses the characteristic in question, e. g. calcium chloride, and that the other may be zinc chloride which is much more easily obtainable and less expensive than the specific ingredients named in the aforesaid British patent.

Other modes of applying the principle of my invention may be employed instead of the one explained, change being made as regards the materials employed, provided the ingredients stated by any of the following claims or the equivalent of such stated ingredients be employed.

I therefore particularly point out and distinctly claim as my invention:—

1. A non-corroding brine for refrigerating and other uses comprising an aqueous solution of calcium chloride together with zinc chloride in the proportion of about 1% of the amount of the calcium chloride.

2. A non-corroding brine for refrigerating and other uses comprising an aqueous solution of calcium chloride and zinc chloride.

3. The method of reducing corrosion of galvanized iron surfaces exposed to an aqueous calcium chloride solution which comprises adding zinc chloride to such solution.

4. The method of reducing corrosion of galvanized iron surfaces exposed to an aqueous calcium chloride solution which comprises including zinc chloride in such solution in proportion of about 1 per cent by weight of the calcium chloride therein.

Signed by me this 20th day of November, 1924.

ARTHUR C. WHITE.